(12) United States Patent
Hashiguchi

(10) Patent No.: US 8,712,167 B2
(45) Date of Patent: Apr. 29, 2014

(54) PATTERN IDENTIFICATION APPARATUS, CONTROL METHOD AND PROGRAM THEREOF

(75) Inventor: Noriyasu Hashiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 13/207,223

(22) Filed: Aug. 10, 2011

(65) Prior Publication Data

US 2012/0051648 A1 Mar. 1, 2012

(30) Foreign Application Priority Data

Aug. 25, 2010 (JP) ................................. 2010-188755

(51) Int. Cl.
*G06K 9/68* (2006.01)
(52) U.S. Cl.
USPC ............................................................ 382/218
(58) Field of Classification Search
USPC .................. 382/181, 192, 195, 209, 218, 305
See application file for complete search history.

(56) References Cited

U.S. PATENT DOCUMENTS

| 6,285,783 | B1 * | 9/2001 | Isomura et al. ............... 382/147 |
| 2010/0180189 | A1 * | 7/2010 | Ito et al. ........................ 715/219 |
| 2011/0090340 | A1 | 4/2011 | Hashiguchi | |

FOREIGN PATENT DOCUMENTS

| JP | 2008-102792 A | 5/2008 |
| JP | 2008-299627 A | 12/2008 |

OTHER PUBLICATIONS

F. C. Crow, "Summed-Area Tables for Texture Mapping", Computer Graphics, Jul. 1984.
P. Viola, et al., "Rapid Object Detection using a Boosted Cascade of Simple Features", Proc. IEEE Conf. on Computer Vision and Pattern Recognition, vol. 1, pp. 511-518, Dec. 2001.

* cited by examiner

*Primary Examiner* — Daniel Mariam
(74) *Attorney, Agent, or Firm* — Fitzpatrick, Cella, Harper & Scinto

(57) ABSTRACT

A pattern identification apparatus computes, for each of multiple data elements in input information stored in an array, an accumulated information value corresponding to the position of the data element in the array, writes each of the computed accumulated information values into one of multiple storage units provided in advance, based on the positions of the corresponding data elements in the array, reads out, in parallel and one each from the storage units, the accumulated information values decided based on the positions in the array that corresponds to a local area, the local area being an area within an area of interest in the input information, calculates a feature amount of the local area using the accumulated information values read out from the storage units, and determines whether or not a predetermined pattern is present in the area of interest by comparing the calculated feature amount with pre-set dictionary data.

11 Claims, 13 Drawing Sheets

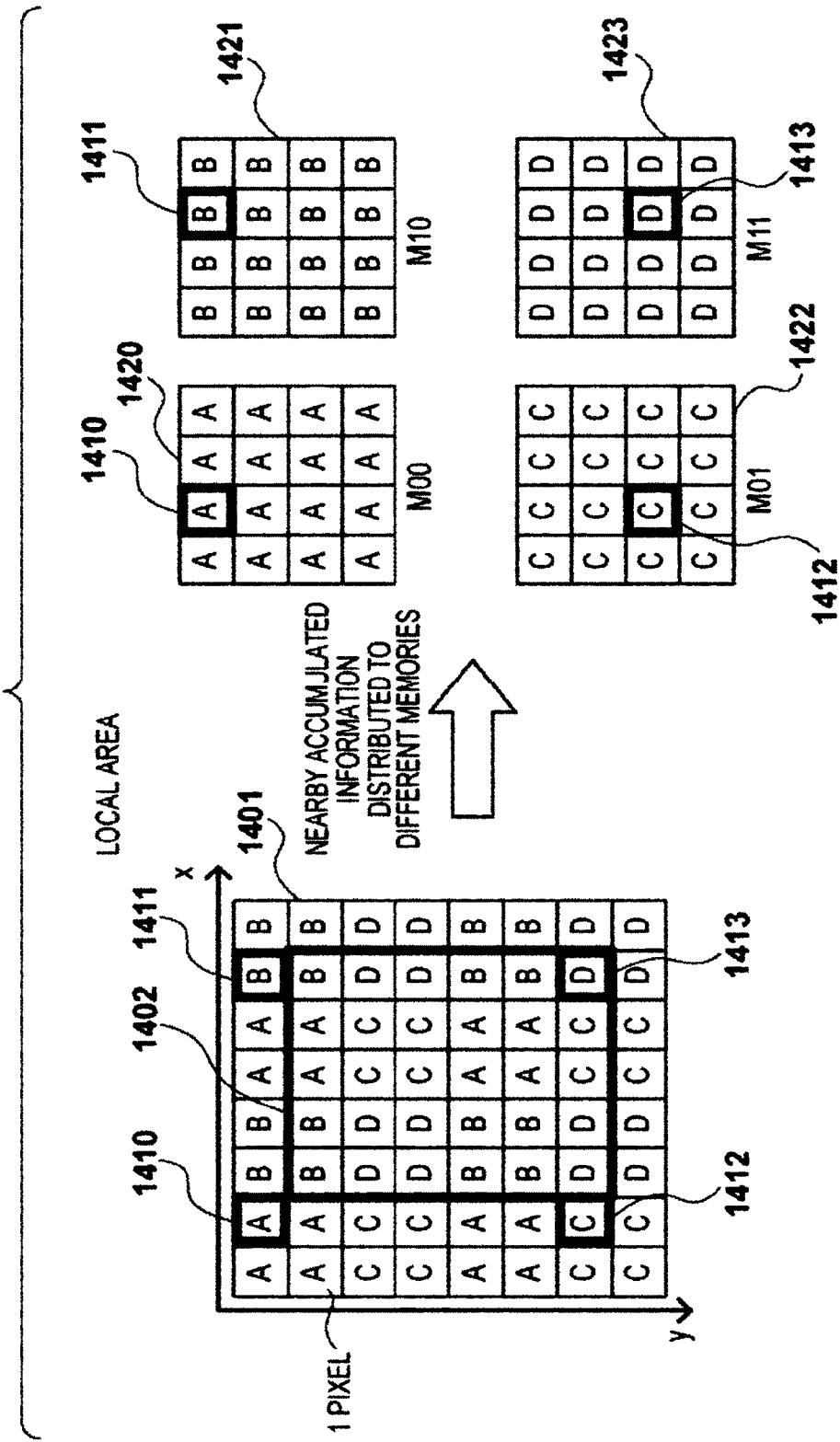

PATTERN IDENTIFICATION APPARATUS, CONTROL METHOD AND PROGRAM THEREOF

BACKGROUND OF THE INVENTION

1. Field of the Invention

The present invention relates to pattern identification apparatuses and control methods and programs thereof, and particularly relates to techniques for recognizing images or analyzing information using accumulated information.

2. Description of the Related Art

Multidimensional array information is often used in the field of information processing. Here, the sum value of elements within the range of a specific region is often found and used in some processes related to image processing, image recognition, image composition, and so on, and in statistical processes and the like.

In the field of computer graphics, a concept regarding accumulated information for original input image information, called a rectangular "summed-area table", has been proposed by F. C. Crow (F. C. Crow, "Summed-Area Tables For Texture Mapping", Computer Graphics, 1984; referred to as "Crow" hereinafter). The "summed-area table" discussed in this document is a two-dimensional array that is the same size (that is, has the same number of elements) as the input image. Assuming that the pixel value of coordinates (x,y) in the input image is I(x,y), a component C(x,y) at a position (x,y) in the summed-area table is defined as indicated in the following Formula (1).

$$C(x, y) = \sum_{\substack{x' \leq x \\ y' \leq y}} I(x', y') \qquad (1)$$

In other words, as shown in FIG. 7, the sum value of pixels within a rectangle in the original input image (7a), whose origin is a position (0,0) and whose opposing corner is a position (x,y), is a value C(x,y) of a position (x,y) in the summed-area table (7b). Note that although Crow describes the position of the origin of the original summed-area table as the lower-left of the image, this specification uses the upper-left as the origin in order to adhere to the descriptions given hereinafter.

According to this definition, the sum of I(x,y) within a given rectangular region located horizontally or vertically in the input image can be found simply by referring to four points in the summed-area table, using the following formula. For example, as shown in FIG. 8, to find the sum $C(x_0, y_0; x_1, y_1)$ of pixel values within a rectangular region that takes $(x_0, y_0)$ and $(x_1, y_1)$ as its opposing corners, Formula (2) may be computed as follows.

$$C(x_0, y_0; x_1, y_1) = C(x_0-1, y_0-1) - C(x_0-1, y_1) - C(x_1, y_0-1) + C(x_1, y_1) \qquad (2)$$

Through this, the sum of the values within a given rectangular region in an image can be found quickly. Japanese Patent Laid-Open No. 2008-299627 discloses a configuration in which accumulated information is computed based on Formula (2).

In the field of image recognition, Viola and Jones refer to the same type of accumulated information as the aforementioned summed-area table as an "integral image". Pattern identification is carried out by calculating feature amounts in multiple local areas using this integral image (P. Viola, M. Jones, "Rapid Object Detection using a Boosted Cascade of Simple Features", Proc. IEEE Conf. on Computer Vision and Pattern Recognition, Vol. 1, pp. 511-518, December 2001). The "local area" refers to a partial region in an image region that has been cut out from an input image.

While feature amounts are calculated for multiple local areas in this pattern identification, parameters found in advance through learning are employed as the feature amounts. The parameters include information such as the position, size, and so on of the local areas for which the feature amounts are to be calculated.

In pattern identification, an extremely high number of local areas are referred to, and accumulated information is read out frequently in order to calculate the feature amounts. For example, in the case where accumulated information has been stored in a single-port memory, from which only a single piece of data can be read out at a time, the readout of four vertices is processed in series through four memory accesses. Assuming that a single memory access takes a single cycle, a minimum of four cycles are required in order to find a single rectangular region.

There are cases where a bottleneck occurs with memory accesses, depending on the detection conditions (that is, the framerate, image size, number of objects to be detected, and so on). There is demand, in such a case, for increasing the speed by making it possible to process some or all of the accesses in parallel, rather than carrying out the four readouts in series.

Storing the accumulated information in a dual-port memory, which is capable of two readouts at a time, in order to reduce the amount of readout time can be given as one way of reducing the readout time. Writing the same accumulated information into four single-port memories and reading out the four vertices from respective memories at the same time can be given as another way.

Furthermore, Japanese Patent Laid-Open No. 2008-102792 discloses dividing an image into multiple integrated areas, generating integral images for each integrated area using the pixel positioned at any one of the corners as the origin, and calculating the sum of cutout regions of the image based on the integral images. According to this configuration, the number of readouts is reduced by aligning one of the corners or sides in the readout region with the pixel that is to serve as the base point for the generation of the integral image.

However, a method that increases the number of ports, such as one that uses a dual-port memory, will also increase the scale of the circuit by the number of ports that have been added. Although it is necessary to increase the number of ports to four in order to simultaneously read out four vertices, this also increases the mounting restrictions and is thus difficult to implement. Meanwhile, the method that stores the same values in four memories results in a circuit scale that is four times as large, and is thus difficult to implement when large memory sizes cannot be secured.

The method disclosed in Japanese Patent Laid-Open No. 2008-299627 reduces the scale of the circuit by reducing the size of a buffer, rather than by storing accumulated information in a memory. Accordingly, that method does not accelerate the reading/writing from/to the memory.

Furthermore, the method disclosed in Japanese Patent Laid-Open No. 2008-102792 is problematic because it is necessary, depending on the readout position, to perform four readouts, as in the past. In other words, that method is useful only in ranges where one of the corners or sides in the readout region can be aligned with the stated base point pixel, but the aforementioned problems with the past techniques remain for readouts of four random points in the integrated area.

SUMMARY OF THE INVENTION

Having been achieved in light of the aforementioned problems, the present invention aims to provide a technique that enables the high-speed reading and writing of an accumulated image without increasing the size of a memory.

According to one aspect of the present invention, a pattern identification apparatus includes: a computation unit adapted to, for each of multiple data elements in input information that are stored in an array, compute an accumulated information value corresponding to the position of the data element in the array; a writing unit adapted to write each of the computed accumulated information values into one of multiple storage units provided in advance, based on the positions of the corresponding data elements in the array; a readout unit adapted to read out, in parallel and one each from the multiple storage units, the accumulated information values decided based on the positions in the array that corresponds to a local area, the local area being an area within an area of interest in the input information; a calculation unit adapted to calculate a feature amount of the local area using the accumulated information values read out from the multiple storage units; and a determination unit adapted to determine whether or not a predetermined pattern is present in the area of interest by comparing the calculated feature amount with pre-set dictionary data.

According to another aspect of the present invention, a control method for a pattern identification apparatus, the method includes: computing, for each of multiple data elements in input information that are stored in an array, an accumulated information value corresponding to the position of the data element in the array; writing each of the computed accumulated information values into one of multiple storage units provided in advance, based on the positions of the corresponding data elements in the array; reading out, in parallel and one each from the multiple storage units, the accumulated information values decided based on the positions in the array that corresponds to a local area, the local area being an area within an area of interest in the input information; calculating a feature amount of the local area using the accumulated information values read out from the multiple storage units; and determining whether or not a predetermined pattern is present in the area of interest by comparing the calculated feature amount with pre-set dictionary data.

Further features of the present invention will become apparent from the following description of exemplary embodiments (with reference to the attached drawings).

BRIEF DESCRIPTION OF THE DRAWINGS

FIG. 14 is a diagram illustrating an example of distributing accumulated information to different memories.

DESCRIPTION OF THE EMBODIMENTS

Hereinafter, embodiments of the present invention will be described with reference to the drawings. In this embodiment, two-dimensional array information such as the summed-area table or integral image described above will be referred to as "accumulated image information". Meanwhile, image information of a two-dimensional array (this includes not only image information such as RGB images and grayscale images, but also image information that has been processed, such as images subjected to a first derivative filter) is referred to as "input image information".

(Configuration of Pattern Identification Apparatus)

The configuration of a pattern identification apparatus according to the present embodiment will be described hereinafter. Then, a method for distributing accumulated image information to memories and simultaneous readout will be described, after which learning will be described.

Figure 1:
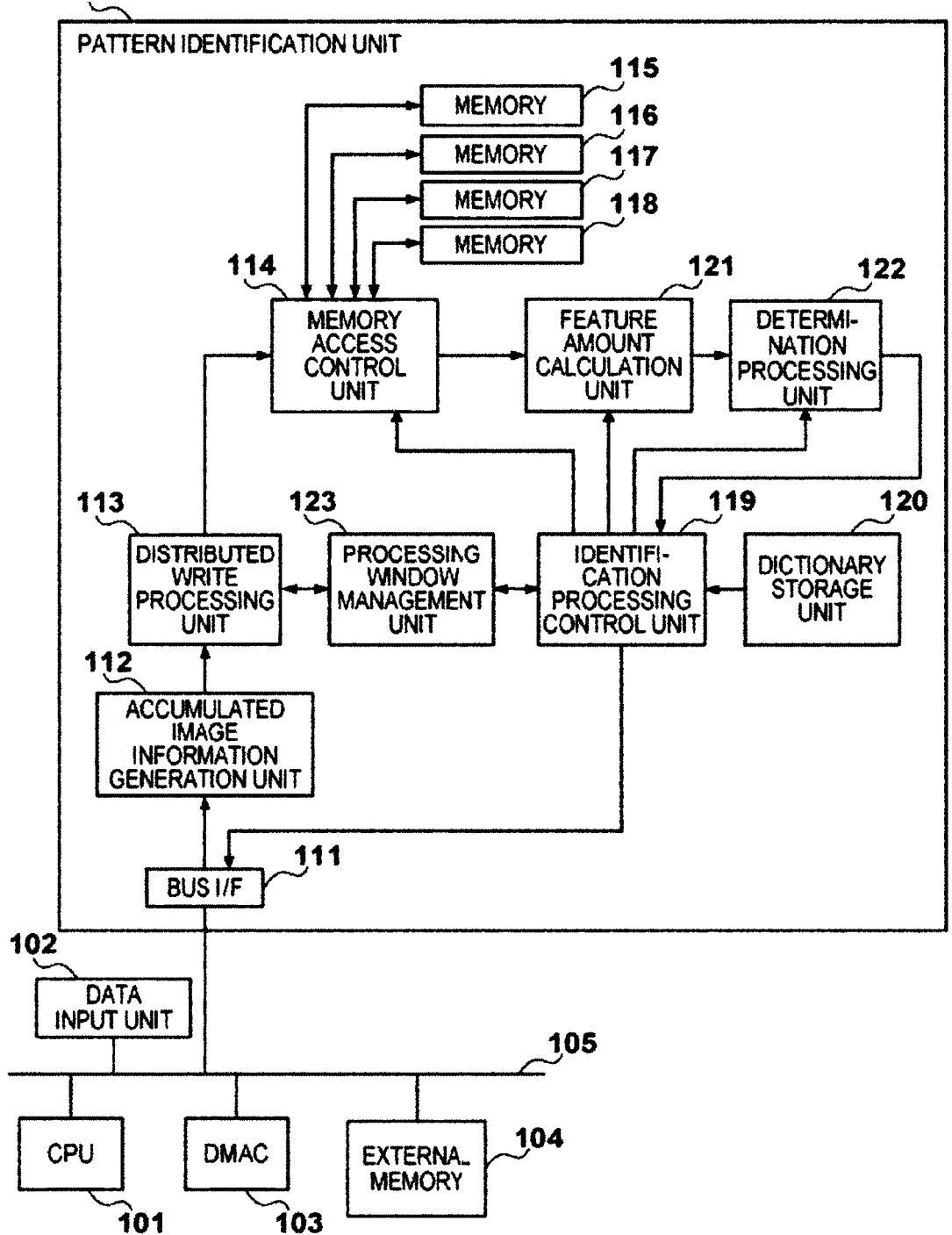
FIG. 1 is a block diagram illustrating the configuration of a pattern identification apparatus according to an embodiment.

FIG. 1 is a block diagram illustrating the configuration of the pattern identification apparatus according to the present embodiment. 101 indicates a CPU, which controls the various elements connected thereto via a bus 105. 102 indicates a data input unit that inputs input image information, the data input unit 102 loading the input image information to be processed into the apparatus. The data input unit 102 may be configured of an image sensor such as a CCD or the like, or may be an I/F unit that has a predetermined communication channel such as a network and receives the data to be processed from an external device.

104 indicates an external memory connected to the bus 105, and the external memory 104 is configured of a storage device such as a ROM, a RAM, or an HDD. The external memory 104 stores program code for the CPU 101 to operate, and is used as a work area when executing various types of processes. The external memory 104 is also used as a region for holding input image information, various types of information used in pattern identification, and so on as necessary. 103 indicates a DMA controller (called a "DMAC" hereinafter), and when the CPU 101 has set and makes operational instructions to the DMAC 103, the transfer of data of a predetermined size to the data input unit 102, the external memory 104, and a pattern identification unit 107 can be carried out continually in an autonomous fashion. When the instructed transfer operations have ended, an interrupt signal is sent to the CPU 101 via the bus 105.

107 indicates the pattern identification unit, and the pattern identification unit 107 carries out a pattern identification process on the input image information that is sent from the DMAC 103 via the bus 105. The pattern identification process determines whether or not a predetermined pattern for detection (for example, an erect image of a face, a human body, or the like) is present in the input image information, and outputs detection information such as a detected position, a detected shape, a likelihood, or the like. The detection information is written into the external memory 104 via the bus 105.

The pattern identification unit 107 includes the following constituent elements:
- a bus interface 111;
- an accumulated image information generation unit 112;
- a distributed write processing unit 113;
- a memory access control unit 114;
- memories 115 through 118;
- an identification processing control unit 119;
- a dictionary storage unit 120;
- a feature amount calculation unit 121;
- a determination processing unit 122; and
- a processing window management unit 123.

The memories 115 through 118 according to the present argument are single-port memories. However, the configuration may employ dual-port memories or other multi-port memories. The roles and operations of the various constituent elements provided in the pattern identification unit 107 will be described hereinafter.

(Overall Processing)

Figure 2:
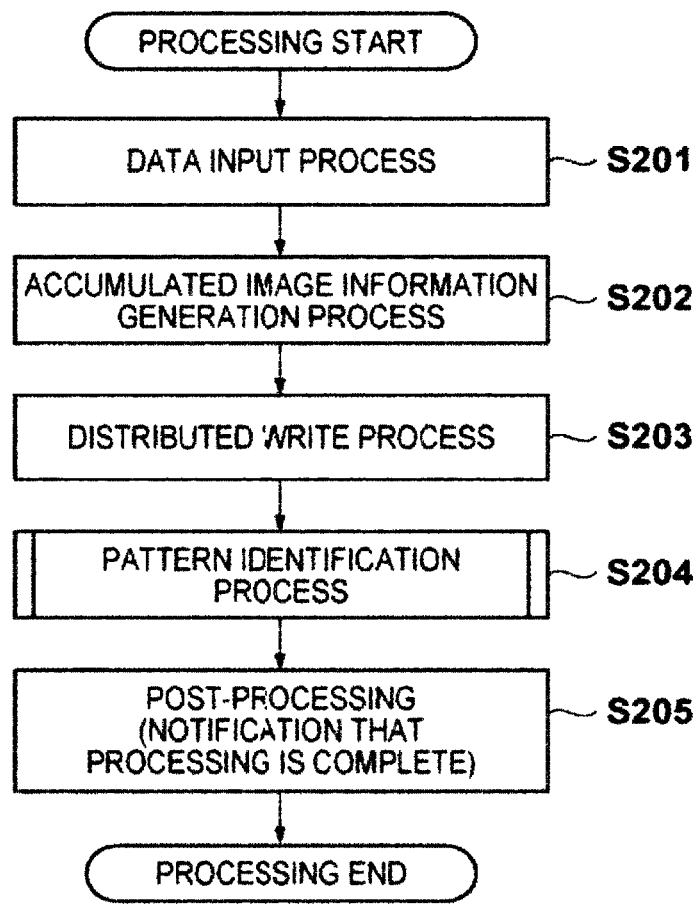
FIG. 2 is a flowchart illustrating an overall process according to an embodiment.

Next, details of the pattern identification apparatus illustrated in FIG. 1, and the flow of the overall processing performed thereby, will be described with reference to the flowchart shown in FIG. 2.

Data Input Process

The pattern identification apparatus according to the present embodiment first executes a data input process S201, in response to a user operation, a processing start trigger from an external device (not shown), or the like. In S201, first, input image information is received through the data input unit 102 in response to an instruction from the CPU 101, and the input image information is stored in the external memory 104 via the bus 105. Next, the input image information stored in the external memory 104 is transferred to the pattern identification unit 107 by the DMAC 103.

The input image information transferred via the bus 105 is received by the pattern identification unit 107 using the bus interface 111, and is then transferred to the accumulated image information generation unit 112. The present embodiment describes a case in which the input image information is input in raster order on a pixel-by-pixel basis, starting with the pixel in the upper-left of the image.

Accumulated Information Generation Process

Next, in S202, an accumulated image information generation process is carried out. The accumulated image information generation unit 112 accumulates the input image information sent in raster order, and generates accumulated image information. The pixel values of the input image information are accumulated, using the pixel in the upper-left of the image as the origin, and the resulting accumulated image information is sequentially transferred to the distributed write processing unit 113. The details of the accumulation process are the same as those described in the aforementioned past techniques, and thus details thereof will be omitted.

Distributed Write Process

Next, in S203, a distributed write process is carried out for the accumulated image information. The distributed write processing unit 113 first inquires with the processing window management unit 123 as to whether it is acceptable to write data into the memories. The processing window management unit 123 carries out the exclusive management of the writing into the memories by the distributed write processing unit 113 and the reading out from the memories by the identification processing control unit 119.

Figure 9:
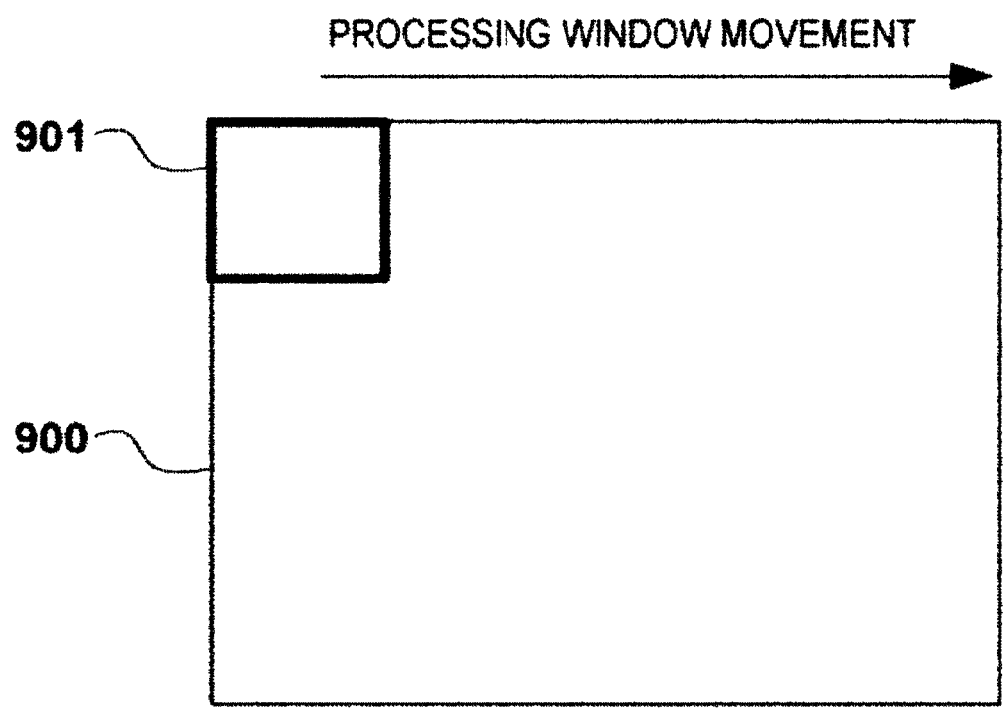
FIG. 9 is a diagram illustrating a processing window.

The "processing window" is the unit by which the pattern identification process is carried out. FIG. 9 is a diagram illustrating the processing window. 900 indicates the input image information, whereas 901 indicates a single processing window; the image region of the processing window 901 is a single unit on which the pattern identification process is carried out. The pattern identification process is carried out on the processing window 901, and it is thus determined whether or not a predetermined pattern for detection is present in the processing window 901. The processing window sequentially moves to the right from the processing window 901 in the upper-left of the input image information 900, and the pattern identification process is carried out in each position. When the processing window has reached the right end, the window returns to the left end and moves downward. The processing window moves sequentially to the lower-right position by repeating this movement.

The distributed write processing unit 113 receives permission to carry out a predetermined number of writes from the processing window management unit 123. The distributed write processing unit 113 then decides on a memory number (that is, of the memories 115 through 118) and an address into which the accumulated image information is to be written on a pixel-by-pixel basis, and instructs the memory access control unit 114 to carry out the write (the write process). Details regarding the method for deciding on the memory number and the address will be described later as a method for distributing the accumulated information to the memories.

The memory access control unit 114 stores the accumulated image information in the memories 115 through 118 in accordance with the instructed memory number and address. The distributed write processing unit 113 notifies the processing window management unit 123 that the writing has ended when the predetermined number of writes has been completed.

Pattern Identification Process

Figure 3:
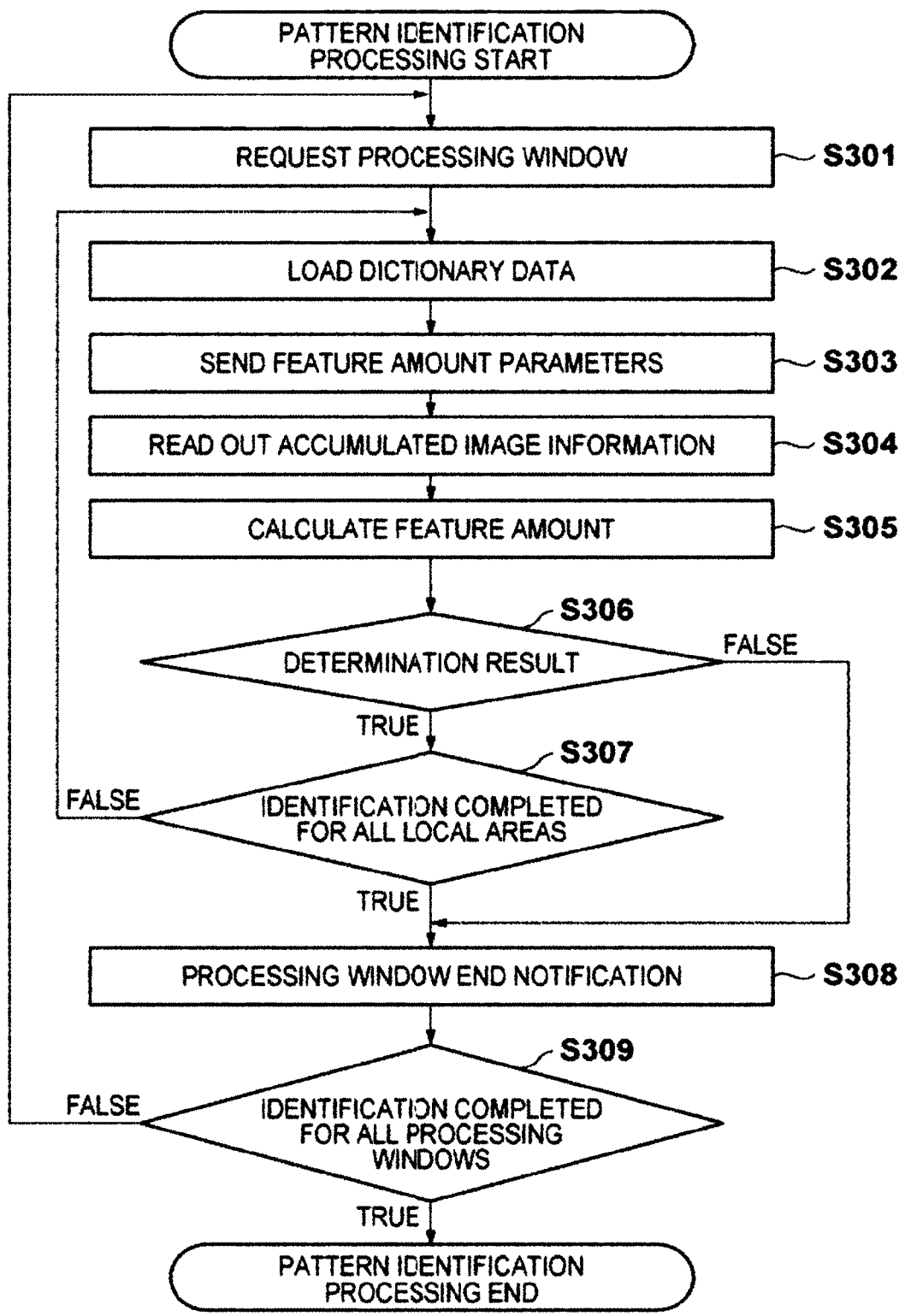
FIG. 3 is a flowchart illustrating a pattern identification process according to an embodiment.

Next, in S204, the pattern identification process is carried out. The pattern identification process carries out determinations using multiple weak discriminators, as described in past techniques. Although there are several processing methods that employ weak discriminators, here, the sum of the pixel values in a local area within the processing window is calculated, and determination processes carried out by the weak discriminators are repeated multiple times using the results of the stated calculation. Hereinafter, details of the pattern identification process will be given with reference to the flowchart shown in FIG. 3.

First, in S301, the pattern identification process requests a processing window. The identification processing control unit 119 requests a processing window on which the processing is to be carried out from the processing window management unit 123. Once a processing window's worth of data has been prepared in the memories 115 through 118, the process moves to S302.

In S302, a dictionary data write process is carried out. The identification processing control unit 119 commences the identification process based on the dictionary data stored in the dictionary storage unit 120. The dictionary data is a parameter group obtained in advance through learning. Parameters such as the positions and shapes of local areas to be used in calculating feature amounts from the accumulated image information, determination processing coefficients, thresholds, and so on are stored in the dictionary data.

Next, in S303, a process for sending feature amount parameters is carried out. The identification processing control unit 119 calculates the memory numbers and addresses for four vertices of a rectangle that is to serve as the local area from the dictionary data parameters, and instructs the memory access control unit 114 to read out the accumulated image information. In addition, parameters (coefficients, thresholds, and so on) to be used by the feature amount calculation unit 121 and the determination processing unit 122 are extracted from the dictionary data and set in the feature amount calculation unit 121 and the determination processing unit 122.

Next, in S304, a process for reading out the accumulated image information (a readout process) is carried out. The memory access control unit 114 reads out data from the memories corresponding to the instructed memory numbers and addresses, and sends that data to the feature amount calculation unit 121. The memory access control unit 114 is provided with a function for carrying out simultaneous readouts in the case where the memories are in an exclusive relationship, or in other words, in the case where the memory numbers are different from each other. Details of the simultaneous readout will be given later. The configuration of the present embodiment makes it possible to continuously keep the memories from which the four vertices are read out in an exclusive relationship and carry out simultaneous readouts.

Next, in S305, a process for calculating a feature amount is carried out. The feature amount calculation unit 121 calculates a sum from the values of the four vertices that have been read out, and calculates a feature amount using the parameters set in S303. Then, the results of calculating the feature amount are sent to the determination processing unit 122.

Next, in S306, a process for determining the results is carried out. The determination processing unit 122 carries out the determination by using and comparing the feature amount calculation results and the parameters set in S303. The determination is carried out such that the predetermined pattern for detection is present (referred to as a determination of "true" hereinafter) if the set parameters are, for example, a threshold and the feature amount calculation results are higher than that threshold, whereas the predetermined pattern for detection is determined not to be present (referred to as a determination of "false" hereinafter) if the results are lower than the threshold. In the case of a determination of "true", the determination result is sent to the identification processing control unit 119, and the process moves to S307. On the other hand, in the case of a determination of "false", the determination is confirmed ("false is confirmed", hereinafter), and the process moves to S308.

Next, in S307, it is determined whether identification has been completed for all the local areas. If the determination result is "true", the process returns to S302, where the identification processing control unit 119 loads the dictionary data for the next local area, and repeats the processes from S302 to S306 for a predetermined number of local areas. If a determination of "true" has been obtained for all of the predetermined local areas, it is confirmed that the predetermined pattern for detection is present ("true is confirmed", hereinafter), and the process moves to S308.

Next, in S308, a notification to terminate the processing window is made. The identification processing control unit 119 notifies the processing window management unit 123 that the processing has ended. Having received this notification, the processing window management unit 123 commences a process for preparing the next processing window.

In the case where the final result for the processing window that was to be processed is a confirmation of "true", the identification processing control unit 119 writes the position information of that processing window into the external memory 104 via the bus interface 111. On the other hand, in the case where "false" has been confirmed, the determination result is not written.

The pattern identification process described thus far is repeated for all of the processing windows in the input image information. When the processing has ended for all the processing windows ("true" in S309), the pattern identification process ends, and the process moves to S205.

Post-Processing

Next, in S205, post-processing is carried out. In the post-processing, the identification processing control unit 119 executes a process for notifying the CPU 101 that the pattern identification process has ended for all of the processing windows.

(Distribution to Memories)

Next, a method for distributing the accumulated image information to memories and simultaneous readout, as well as learning, will be described. First, a method for distributing the accumulated image information to the memories in accordance with a predetermined rule according to the present embodiment will be described. The "predetermined rule" according to the present embodiment refers to a method that distributes adjacent pixels to different memories.

Figure 4:
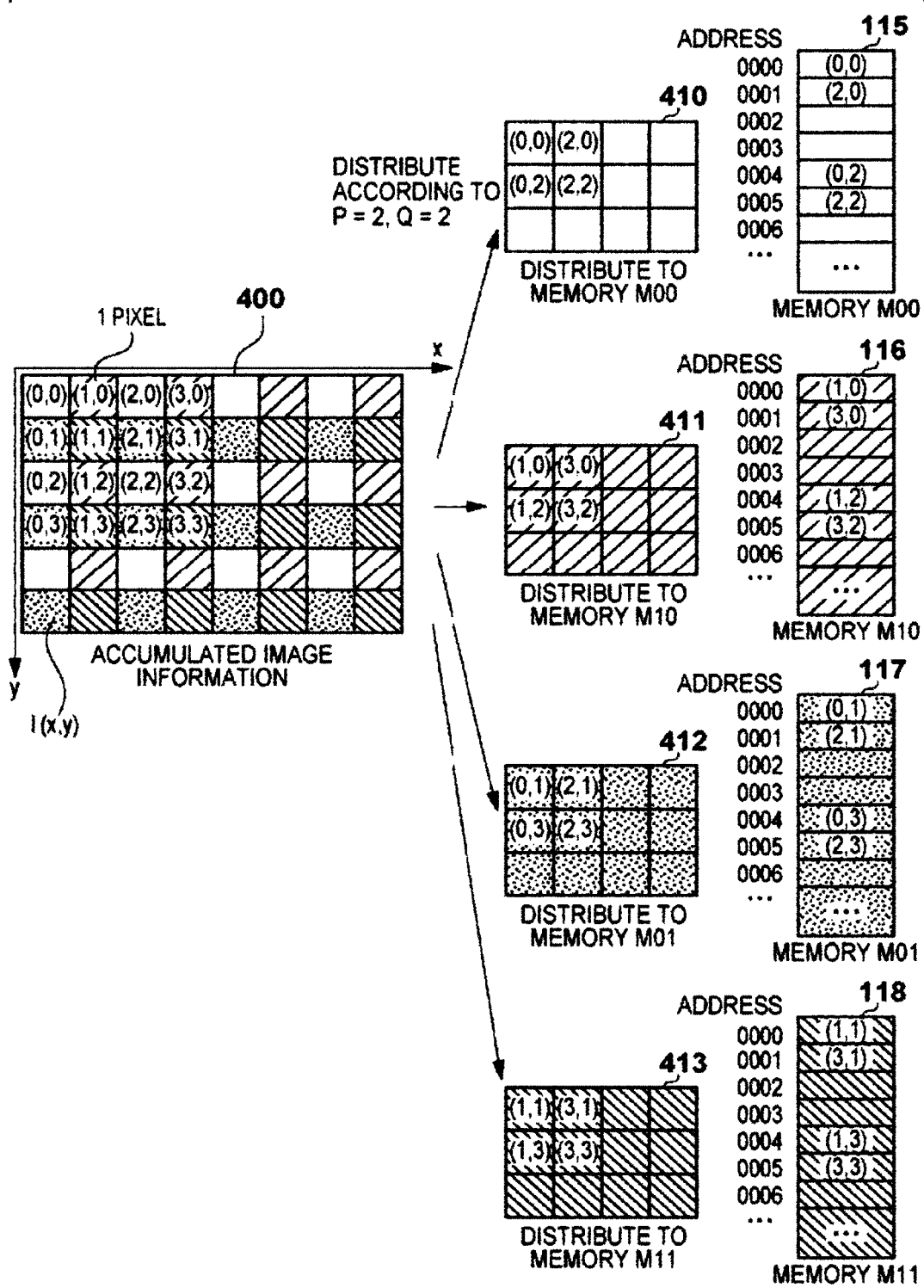
FIG. 4 is a diagram illustrating distribution to memories according to an embodiment.

In FIG. 4, 400 indicates the accumulated image information. Here, the coordinates of the respective pixels in the accumulated image information 400 are expressed as (x,y), with the upper-left of the accumulated image information 400 serving as the origin, the horizontal direction indicated by x, and the vertical direction indicated by y. The coordinates of the origin are assumed to be (0,0). Each square in the accumulated image information 400 indicates a single pixel.

Next, a generalization of the aforementioned predetermined rule according to the present embodiment will be described. The pixel values of the coordinates (x,y) in the accumulated image information 400 are expressed as C(x,y). The number of distributions in the x direction is expressed as P, whereas the number of distributions in the y direction is expressed as Q. P and Q are integers of 1 or more aside from when both P=1 and Q=1 (that is, (P,Q)≠(1,1)), and the total number of memories into which the data is distributed is P×Q; memories are expressed as Mpq (storage devices Mpq). p and q express memory numbers, where p is a memory number value in the x direction and q is a memory number value in the y direction.

Here, the storage destination of C(x, y) is expressed using Formula (3).

$$Mpq[\text{address}] = C(x,y) \tag{3}$$

Meanwhile, the memory numbers p and q into which the pixel values of the coordinates (x,y) are stored are expressed using the following Formulas (4) and (5).

$$p = x \% P \tag{4}$$

$$q = y \% Q \tag{5}$$

Note that "%" expresses a remainder calculation.

The respective coordinates (x',y') of the memories Mpq are expressed through Formulas (6) and (7).

$$x' = x/P \tag{6}$$

$$y' = y/Q \tag{7}$$

Note that the number is rounded down to the nearest whole number in the division (/) carried out when calculating x', y'.

Meanwhile, if the width of the image stored in the memories Mpq is defined as m_width, m_width can be expressed through a formula such as that shown hereinafter, based on the width "width" of the accumulated image information to be distributed and the value of P.

$$m\_\text{width} = \text{width}/P \tag{8}$$

Note that the number is rounded up to the nearest whole number in the division (/) carried out when calculating m_width.

The addresses of the storage destinations in the memories Mpq are expressed through the following formula.

$$\text{address} = m\_width * y' + x' \quad (9)$$

The preceding have been general formulas for distributing the accumulated image information to the memories according to the predetermined rule.

Next, the specifics of the distribution into the memories 115 through 118 as described in the present embodiment will be given with reference to FIG. 4. FIG. 4 assumes that the number of distributions in the x direction is 2 (P=2) and that the number of distributions in the y direction is 2 (Q=2). In addition, because the image width of the accumulated image information 400 is 8 and P=2, the width m_width of the image stored in the memories Mpq is 4. Based on the above, the accumulated image information 400 in each set of coordinates is distributed.

For example, for the storage destination of C(3,2), p=1 and q=0 based on Formulas (4) and (5), x'=1 and y'=1 based on Formulas (6) and (7), and address=5 based on Formula (9). As a result, Formula (3) becomes M10[5]=C(3,2), and thus the value of C(3,2) is stored in address=5 of the memory (M10). The accumulated image information 400 is distributed to and stored in the memories 115 through 118 shown in FIG. 4 as a result of these computations. 410 through 413 in FIG. 4 express the arrays in each memory in a two-dimensional manner. The numerical values written in the memories and the pixel data expressed two-dimensionally indicate the coordinates of the corresponding accumulated image information 400.

The preceding has described a method for distributing the accumulated image information to the memories according to the present embodiment.

Although the present embodiment describes the accumulated image information as being input in raster order, it is also possible to employ a counter and carry out this process simply through adding computations, rather than computing the memory numbers and addresses of the storage destinations. With the configuration of the present embodiment, distributing and storing data into the memories under the relationships indicated in Formulas (3) through (9) is important, and no restrictions are made on differences in how this is implemented.

Next, a method for simultaneously reading out the values of the four vertices of the local area from the accumulated image information that has been distributed and stored will be described. It is necessary for the memories to be in an exclusive relationship in order to read the data out from the memories simultaneously. For this reason, the following conditions are defined for the shape of the local area. First, generalized conditional expressions will be described.

With respect to the shape of the local area, assuming that the width thereof is defined as la_width and the height thereof is defined as la_height, conditional expressions derived based on the distribution rule according to the present embodiment are expressed by Formulas (10) and (11).

$$la\_width\,!=P*n \quad (10)$$

$$la\_height\,!=Q*m \quad (11)$$

Note that both n and m are integers greater than or equal to 1. Furthermore, "!" used in the conditional expressions (10) and (11) expresses a negation. In other words, la_width is a value aside from a multiple of P, and la_height is a value aside from a multiple of Q.

When both of the aforementioned conditional expressions (10) and (11) are met, the memories can be put into an exclusive relationship, which makes it possible to simultaneously read out the values of the four vertices of the local area. Meanwhile, if one of the conditional expressions (10) and (11) can be met, the values of two of the vertices of the local area can be read out simultaneously. Meanwhile, it can be seen from the conditional expressions (10) and (11) that, in the case where the values of P and Q have been increased to 3 or more, the value ranges of la_width and la_height are increased compared to when P=2 and Q=2. For example, in the case where P=2, la_width is an odd number, and thus two numbers, or 1 and 3, can be selected from a width of 1 to 5. However, in the case where P=5, la_width is a value aside from a multiple of 5, and thus the number of choices expands to four, or 1, 2, 3, and 4.

(Accumulated Image Readout)

Figure 5:
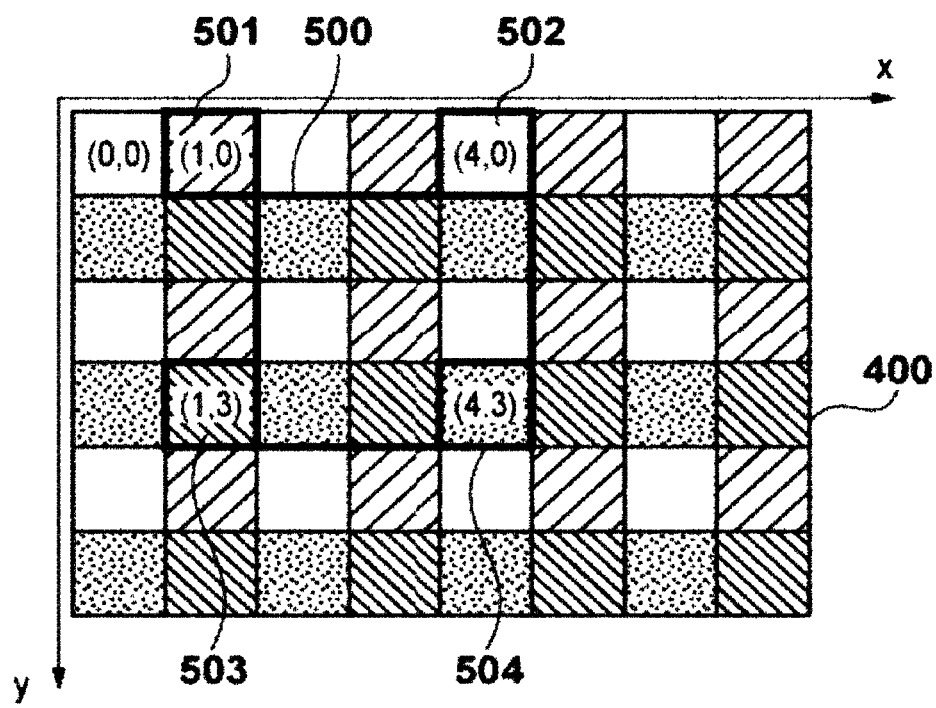
FIG. 5 is a diagram illustrating local areas and readout coordinates according to an embodiment.
Figure 6:
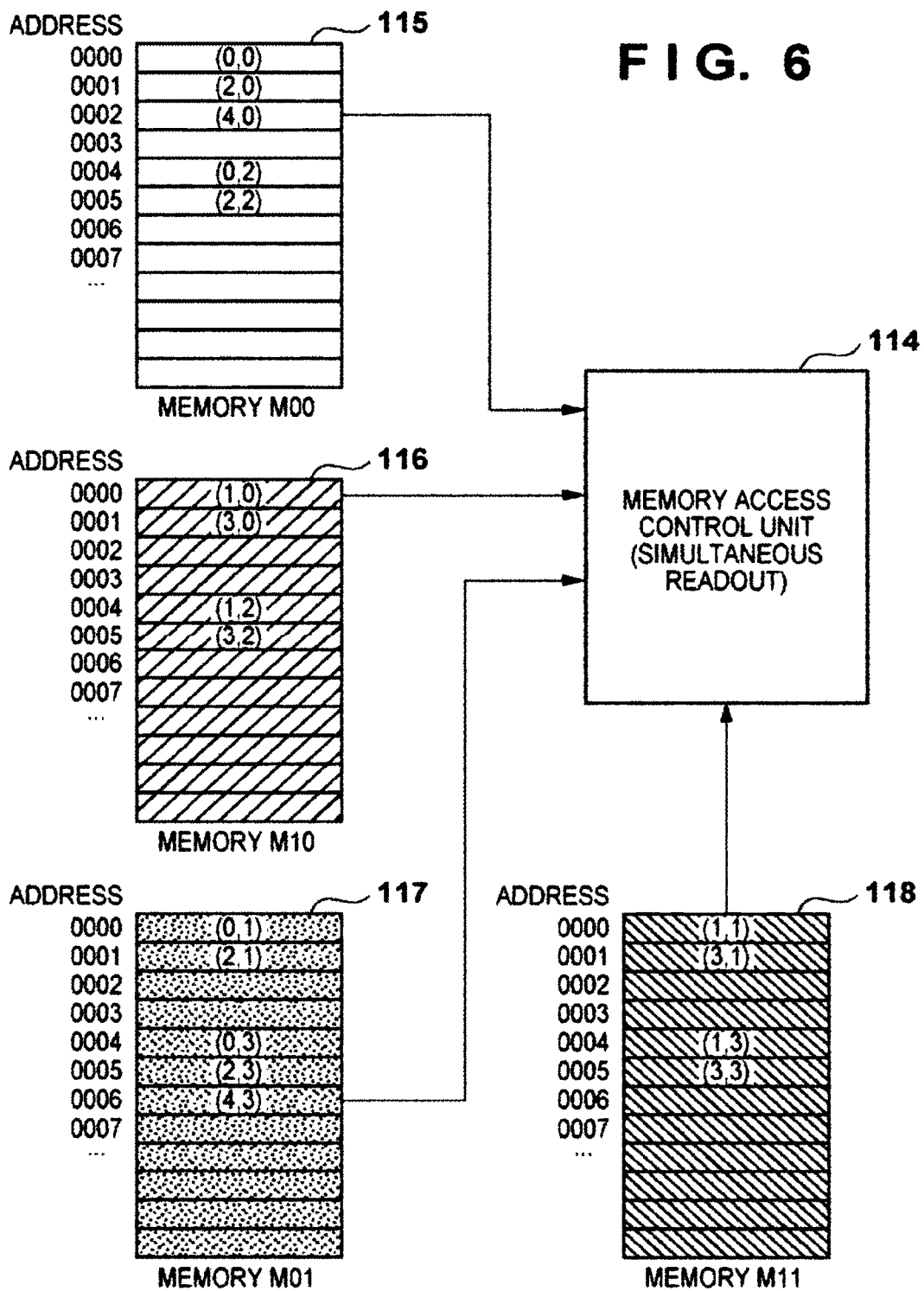
FIG. 6 is a diagram illustrating simultaneous readout according to an embodiment.
Figure 7:
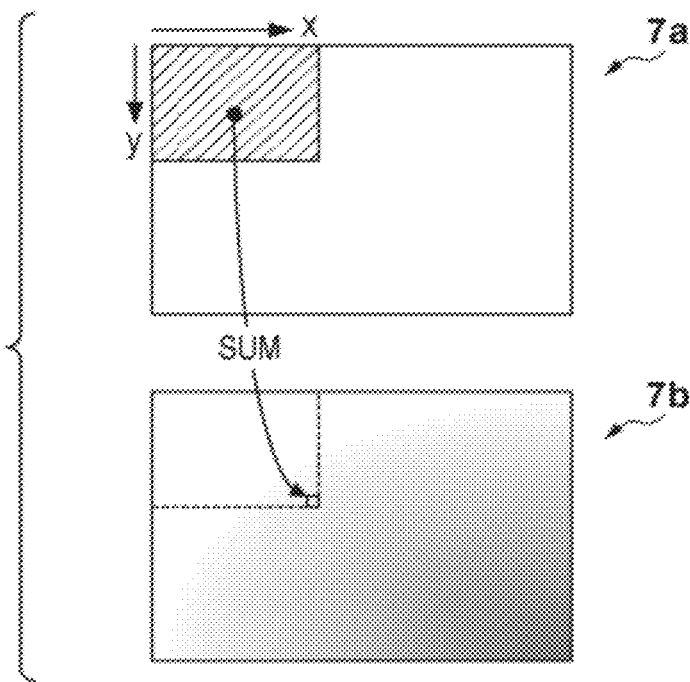
FIG. 7 is a diagram illustrating a method for generating accumulated image information for input image information.
Figure 8:
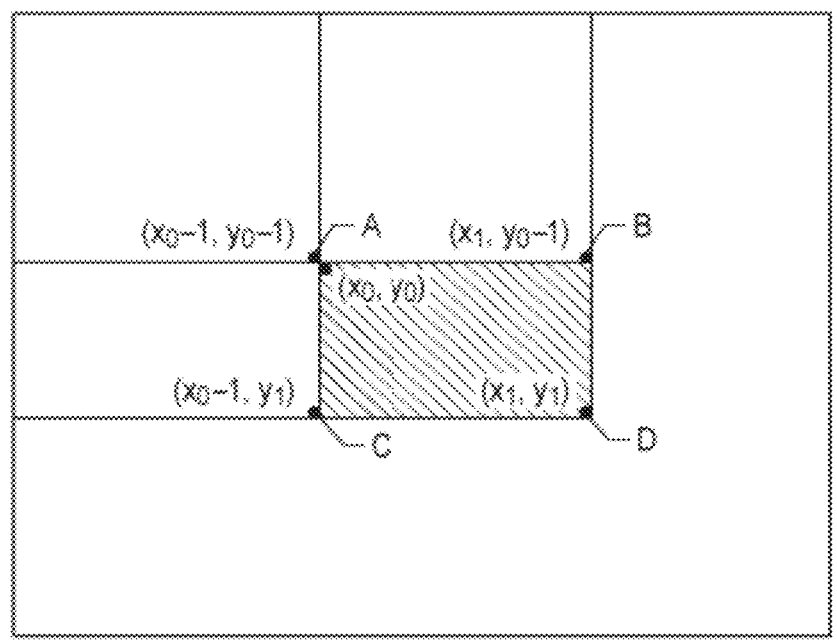
FIG. 8 is a diagram illustrating coordinates read out from accumulated image information for calculating a sum.

Next, specifics of the method for simultaneously reading out the data of four vertices from the memories 115 through 118, as described in the present embodiment, will be given. FIG. 5 is a diagram in which a local area has been superimposed over the pre-distribution accumulated image information 400. The bold frame, indicated by 500 in FIG. 5, shows the rectangular local area. Pixels 501 through 504 are the pixels at the four vertices of the local area that are to be read out. The local area 500 is a rectangular area that meets the conditions indicated in the conditional expressions (10) and (11), in which la_width=3 and la_height=3. The form of the accumulated image information 400 shown in FIG. 5 corresponds to that described in relation to the distribution to the memories illustrated in FIG. 4, and thus the pixels 501 through 504 are pixels that are stored in different memories. Meanwhile, FIG. 6 is a diagram illustrating the content of the memories 115 through 118, and the numerical values written in the memories are coordinates that correspond to the accumulated image information 400. It can be seen that the memories are in an exclusive relationship, with the pixel 501 being stored in the memory (M10), the pixel 502 being stored in the memory (M00), pixel 503 being stored in the memory (M11), and the pixel 504 being stored in the memory (M01). Because the memories are in an exclusive relationship, the data can be read out simultaneously by the memory access control unit 114.

(Learning)

Next, learning will be described. Thus far, the conditions for simultaneous readout have been described; here, a learning method for ensuring that these conditions are met will be described. In pattern identification processes, learning is widely used as a method for deciding on a benchmark for identifying whether or not an item contained within an image is a pattern for detection. In the present embodiment, parameters decided on as a result of learning are referred to as "dictionary data".

"Learning" refers to deriving and recording predetermined parameters from each of multiple sample images in which it is known that a predetermined pattern for detection is present and from each of multiple sample images in which it is known that the predetermined pattern for detection is not present. The position and size of local areas is also included in these predetermined parameters.

In one example of a learning method, the parameters of the local areas are decided upon having evaluated all of the local areas within each of the sample images through learning. In the present embodiment, the parameters are decided upon having added the aforementioned simultaneous readout conditions to the evaluation of the local areas in the learning process. To be more specific, only the local areas whose widths and heights conform to the conditional expressions (10) and (11) are extracted from the local area group that is conventionally evaluated in each of the sample images. The learning then evaluates and decides upon the parameters using the extracted local area group.

Although the foregoing has described an example of learning, incorporating the conditions of one or both of the conditional expressions (10) and (11) being met into the learning is important in the configuration of the present embodiment, and therefore no restrictions are placed on the method of the learning itself. The widths and heights of the local areas in the dictionary data learned through the aforementioned method all conform to the conditional expressions (10) and (11). As a result, it is possible for the memory access control unit 114 to always read out the data simultaneously.

As described thus far, with the configuration according to the present embodiment, the accumulated image information is exclusively stored in multiple memories, and pattern identification is carried out by reading out multiple pieces of the accumulated image information in parallel from the multiple memories and calculating feature amounts of local areas. Accordingly, it is possible to quickly read out the accumulated image information without increasing the size of the memories.

In addition, in the present embodiment, accumulated information values corresponding to data elements that are present in positions adjacent to each other are written into respectively different memories, for input information (image information) configured of multiple data elements that are stored in a two-dimensional array. For this reason, as long as the vertical and horizontal lengths are both odd-number multiples of the length of a single pixel, pattern identification can be carried out for local areas of any desired size.

In addition, the dictionary data is updated using image information that has been determined in advance to contain a predetermined pattern and image information that has been determined in advance to not contain the predetermined pattern, which makes it possible to learn the parameters.

Thus, as described thus far, a rule for distribution to memories and conditions for simultaneous readout are defined, and by adding those conditions to the learning, the accumulated information in the positions of the vertices in the local area can always be read out simultaneously from multiple memories without increasing the overall memory size.

Although the embodiment thus far has described defining a rule for distribution to the memories and conditions for simultaneous readout, and ensuring that those conditions are met during learning, the present invention is not limited thereto. The following embodiment will describe a method for converting parameters so as to conform to the rule for distribution to memories and the conditions for simultaneous readout. The configuration according to the present embodiment includes elements that are the same as those in the configuration according to the aforementioned embodiment, and therefore only the differences will be described.

Figure 10:
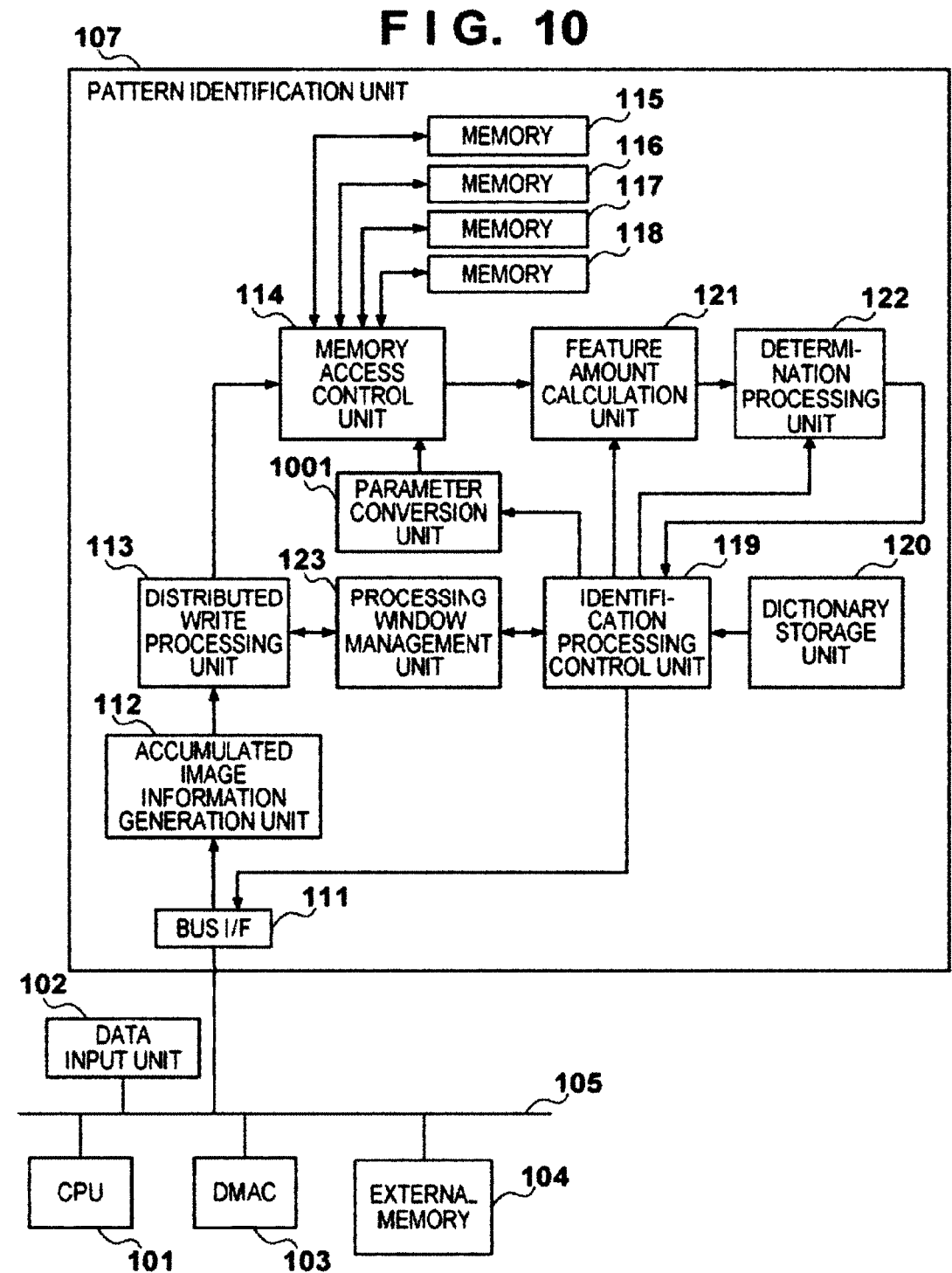
FIG. 10 is a block diagram illustrating the configuration of a pattern identification apparatus according to another embodiment.

FIG. 10 illustrates the configuration of a pattern identification apparatus according to the present embodiment. In terms of the configuration, the difference between the present embodiment and the aforementioned embodiment is that a parameter conversion unit 1001 has been added between the identification processing control unit 119 and the memory access control unit 114.

Figure 11:
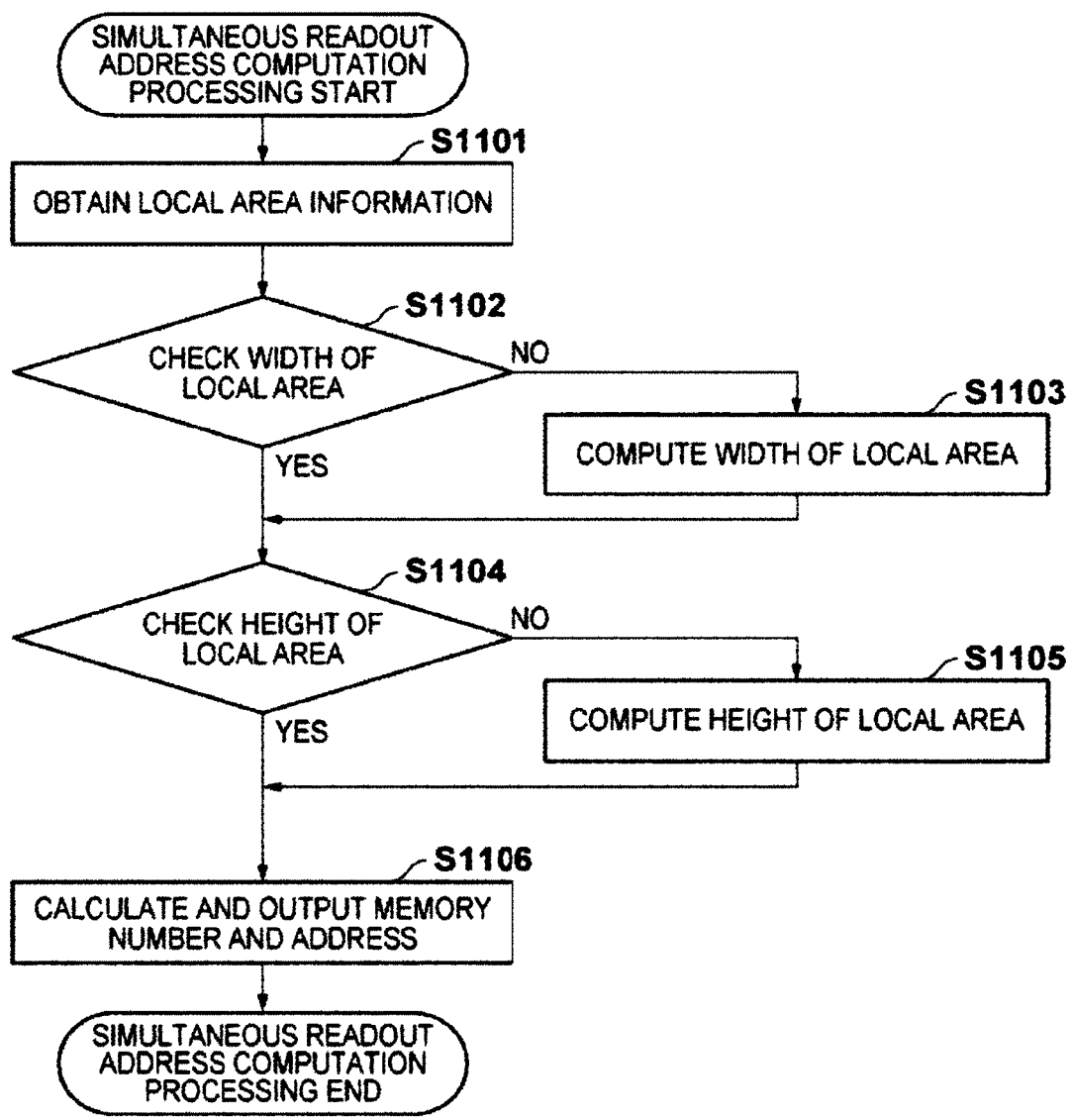
FIG. 11 is a flowchart illustrating a parameter conversion process according to another embodiment.

The parameter conversion unit 1001 converts parameters so that the memory readout for the four vertices in the local area instructed by the identification processing control unit 119 conforms to the conditional expressions (10) and (11). FIG. 11 is a flowchart illustrating a computation process according to the present embodiment. Although the memory numbers and addresses for the four vertices of the local area are calculated by the identification processing control unit 119 in the aforementioned embodiment, the identification processing control unit 119 specifies the local area according to the upper-left coordinates and the width and height thereof in the present embodiment.

First, in S1101, the parameter conversion unit 1001 obtains the specified upper-left coordinates and the width and height of the local area from the identification processing control unit 119.

Next, in S1102, it is determined whether or not the width of the local area conforms to the conditional expression (10). In the case where the width conforms (YES in S1102), the process moves to S1104, whereas in the case where the width does not conform (NO in S1102), the process moves to S1103.

In S1103, the width of the local area is computed, and a computation for causing that width to conform to the conditional expression (10) is carried out. This is expressed as follows, assuming that the specified width of the local area is la_w and the width of the local area that conforms to the conditional expression (10) is la_width.

$$la\_width = la\_w - 1 \tag{12}$$

When the processing in S1103 ends, the process advances to S1104.

In S1104, it is determined whether or not the height of the local area conforms to the conditional expression (11). In the case where the height conforms, the process moves to S1106, whereas in the case where the height does not conform, the process moves to S1105.

In S1105, the height of the local area is computed, and a computation for causing that height to conform to the conditional expression (11) is carried out. This is expressed as follows, assuming that the specified height of the local area is la_h and the height of the local area that conforms to the conditional expression (11) is la_height.

$$la\_height = la\_h - 1 \tag{13}$$

When the processing in S1105 ends, the process advances to S1106.

In S1106, the memory numbers and addresses of the four vertices to be read out are calculated by the memory access control unit 114. This calculation finds the coordinates of the four vertices from the upper-left coordinates $(x_0, y_0)$ and the width and height, and calculates the memory numbers and addresses from Formulas (4) through (9).

As described thus far, according to the present embodiment, the parameter information indicating the shape of the local area is converted based on a rule for the distribution to memories that has been determined in advance. Then, when reading out the accumulated image information, the memories (storage devices) and memory addresses from which to read out the accumulated information values are decided on based on the converted parameter information. For this reason, according to the configuration of the present embodiment, the parameter information can be automatically converted based on the rule for the distribution to memories, and the simultaneous readout can then be executed.

Accordingly, the width and height of the local area conforms to the conditional expressions (10) and (11) as a result of the processing performed by the parameter conversion unit 1001. As a result, it is possible for the memory access control unit 114 to always read out the data simultaneously.

Although the present embodiment describes an example in which the parameter conversion unit 1001 carries out the conversion during the identification process, it should be noted that a similar conversion process may be carried out on the dictionary data in advance, and the pattern identification process may then be carried out using the converted dictionary data. In this case, the configuration is the same as that shown in FIG. 1 and described in the aforementioned embodiment. Furthermore, in the present embodiment, the configuration may be such that one of the conversion formulas (12) and (13) is met and only some of the readouts are carried out simultaneously.

The conversion formulas (12) and (13) are examples for shifting the coordinates to nearby coordinates, and thus the computation may be such that 1 is added to the width and height of the local area in the dictionary data. What is important is converting the shape of the local area to a shape that conforms with the conditional expressions (10) and (11).

In addition, in the present embodiment, the positions of the readout coordinates are shifted from the parameters of the original dictionary data, and thus differences appear in the values of the sums between the pre-conversion and post-conversion shape of the local area. As a method for handling this, the values of the sums may be interpolated through a formula such as the following Formula (14), where the surface area ratio between the pre-conversion and post-conversion shapes of the local area is multiplied by a sum value $S2d$ to find $S2d'$.

$$S2d' = (la\_width \times la\_height)/(la\_w \times la\_H) \times S2d \quad (14)$$

While the previous embodiments have described examples of two-dimensional array information called "accumulated image information", the following embodiment will describe a method that applies the same technique to one-dimensional information. In the present embodiment, the data of a one-dimensional array is input, and the input data will be referred to as "one-dimensional input information". Meanwhile, accumulated one-dimensional input information will be referred to as "one-dimensional accumulated information".

Figure 12:
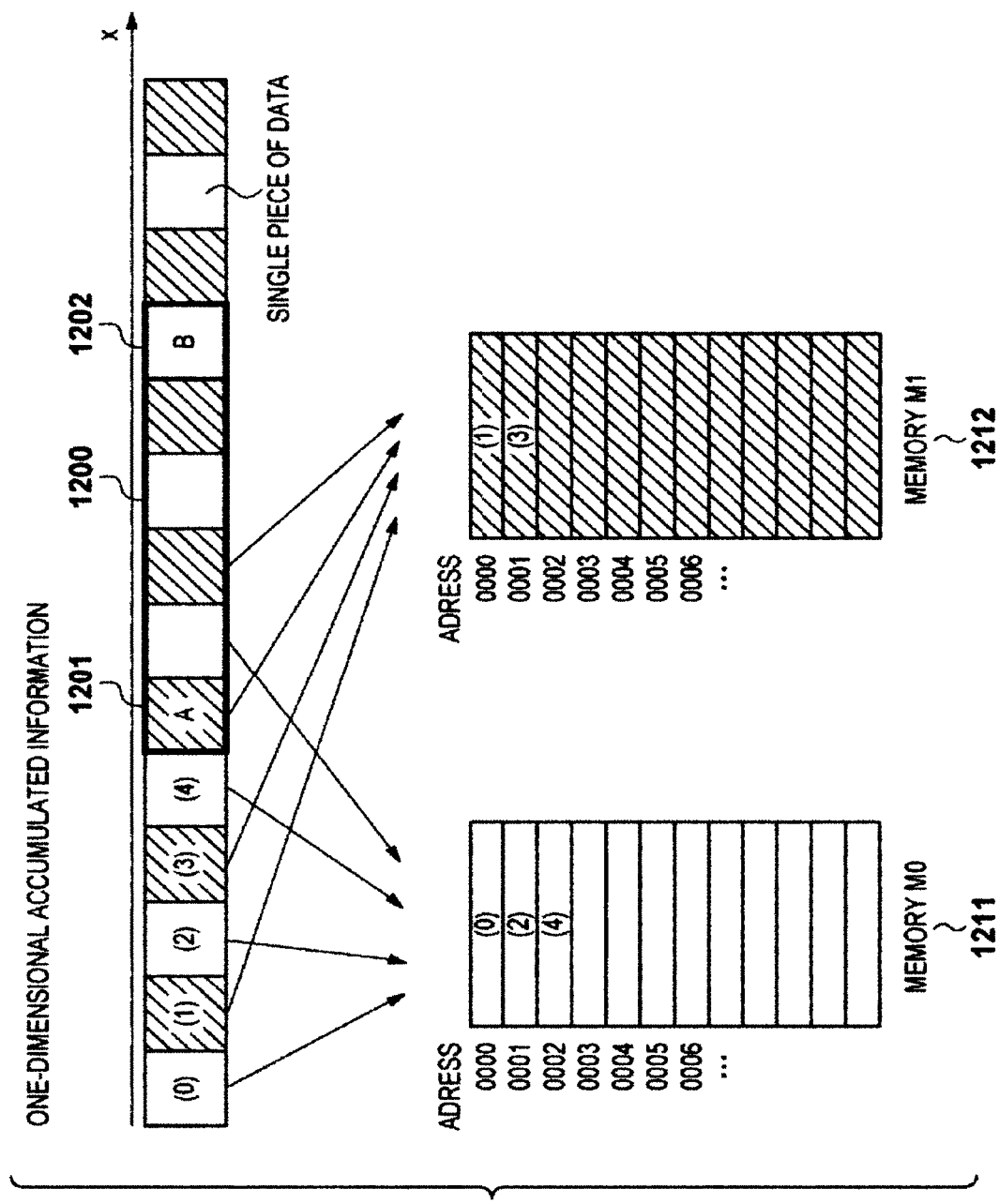
FIG. 12 is a diagram illustrating the distribution of one-dimensional accumulated information to memories according to still another embodiment.

The accumulated information of a one-dimensional array according to the present embodiment is as shown in FIG. 12. In FIG. 12, information resulting from accumulating the data values in the x direction starting with data 1201 is taken as one-dimensional accumulated information 1200. Numerical values within the parentheses in the data indicate coordinates in the x direction.

The configuration of the pattern identification apparatus according to the present embodiment is essentially the same as that of the aforementioned embodiments, the difference being that there are two memories. However, some of the processes differ from those in the aforementioned embodiments; namely, the method for distributing data to the memories and the conditions for simultaneous readout are different. Hereinafter, the differences will be described.

(Distribution to Memories)

First, a method for distributing the one-dimensional accumulated information into the memories will be described. The values of the coordinates (x) of the one-dimensional accumulated information are expressed as $C(x)$. The number of distributions in the x direction is expressed as P. P is an integer of 2 or more, and assuming that the total number of memories to which data is to be distributed is P, the memories are expressed as Mp (storage devices Mp). p represents a memory number, and indicates the memory number value in the x direction. The storage destination of $C(x)$ is expressed through Formula (15).

$$Mp[\text{address}] = C(x) \quad (15)$$

The memory number p into which the pixel value of the coordinate (x) is stored is expressed using the following Formula (16).

$$p = x\%P \quad (16)$$

Here, "%" expresses a remainder calculation.

The coordinates (x') of the memory Mp are expressed through the Formula (17).

$$x' = x/P \quad (17)$$

Note that the number is rounded down to the nearest whole number in the division (/) carried out when calculating x'.

The address of the storage destination memory Mp is expressed through the following formula.

$$\text{address} = x' \quad (18)$$

The preceding have been formulas used for distributing the one-dimensional accumulated information to memories in accordance with a predetermined rule.

In the present embodiment, as shown in FIG. 12, P=2, and thus the data is stored in a memory (M0(1211)) and a memory (M1(1212)). Based on the above, the one-dimensional accumulated information 1200 in each of the coordinates is distributed. For example, the storage destination memory for C(3) is the memory (M1), based on Formula (16). As for the storage destination address, x'=1 based on Formula (17), and thus based on Formula (18), address=1. As a result, Formula (15) becomes M1[1]=C(3), and thus the value of C(3) is stored in address=1 of the memory (M1). The one-dimensional accumulated information 1200 is distributed to and stored in the memories 1211 through 1212 shown in FIG. 12 as a result of these computations.

(Accumulated Image Readout)

Next, conditions for simultaneous readout will be described. In the one-dimensional accumulated information, a straight line section 1220 corresponds to the local area described in the aforementioned embodiments (this is referred to as "local piecewise" in the one-dimensional accumulated information). Here, the coordinates of the two points indicating the ends of the local piecewise 1220 are taken as (x0),(x1).

A and B are assumed to represent respective accumulated information value positions, as indicated in Formula (19).

$$A:(x_0-1)$$
$$B:(x_1) \quad (19)$$

Here, the sum value Sld of the elements within the local piecewise 1220 of the one-dimensional input information can be computed through Formula (20).

$$Sld = B - A \quad (20)$$

Here, when the length of the local piecewise is defined as la_length, a conditional expression derived in accordance with the distribution rule according to the present embodiment is expressed by Formula (21).

$$la\_length! = P*n \quad (21)$$

Here, n is an integer of 1 or more. Furthermore, "!" used in the conditional expression (21) expresses a negation. In other words, la_length has a value aside from a multiple of P.

When the aforementioned conditional expression (21) is met, the memories can be put into an exclusive relationship, which makes it possible to simultaneously read out the values of the two points at the ends of the local piecewise.

Thus, as described thus far, a rule for distribution to memories and conditions for simultaneous readout are defined, and by adding those conditions to the learning, the accumulated information in the positions of the both ends of the local piecewise can always be read out simultaneously from multiple memories without increasing the overall memory size, even for one-dimensional information.

The following embodiment will describe an example in which the aforementioned method is applied to three-dimensional information. In the present embodiment, the data of a three-dimensional array is input, and the input data will be referred to as "three-dimensional input information". "Three-dimensional input information" is, for example, moving picture information, and such three-dimensional input information is obtained by adding another dimension, or a time axis, to a two-dimensional image. Meanwhile, accumulated three-dimensional input information will be referred to as "three-dimensional accumulated information".

Figure 13:
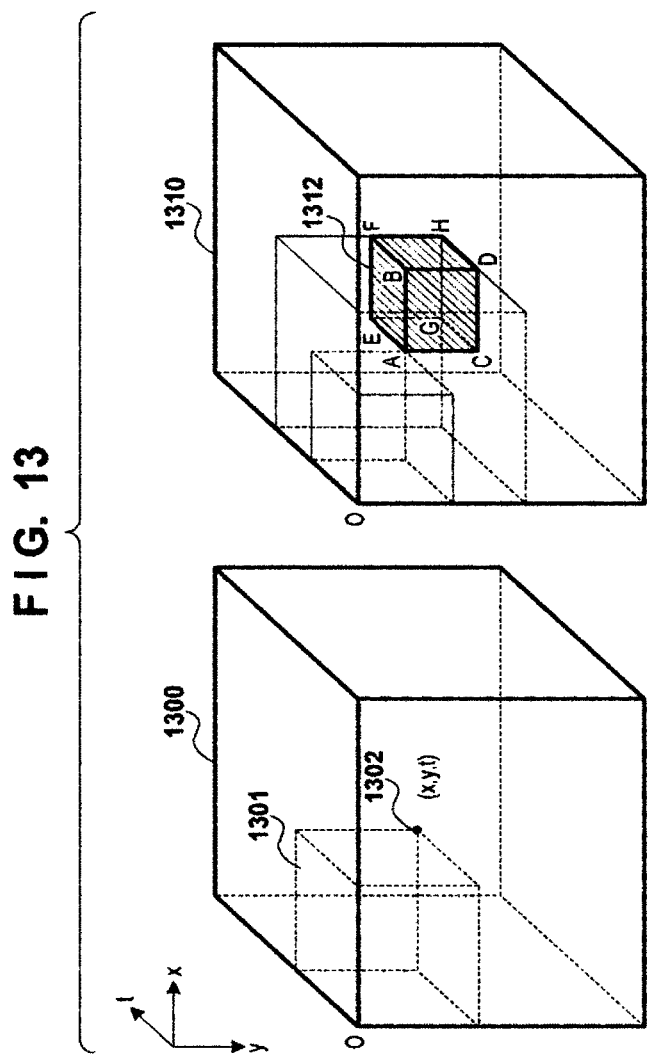
FIG. 13 is a diagram illustrating three-dimensional accumulated information and local spaces according to still yet another embodiment.

The accumulated information of a three-dimensional array according to the present embodiment is as shown in FIG. 13. In FIG. 13, three-dimensional accumulated information 1310 is obtained by accumulating the values of three-dimensional input information 1300 in the x direction, the y direction, and the t direction, starting with an origin O. For example, the value of the coordinates (x,y,t) of a point 1302 in the three-dimensional accumulated information 1310 corresponds to the total value of the data contained in a cuboid 1301 having the origin O to the point 1302 as the opposing corners. In the present embodiment, the cuboid is thought of as moving picture information, and thus the x direction is defined as the width, the y direction is defined as the height, and the t direction is defined as time. Although the t direction is defined as the time axis here, this may be taken as the z direction in the case of a three-dimensional space and defined as the depth direction.

The configuration of the pattern identification apparatus according to the present embodiment is essentially the same as in the aforementioned embodiments; in the present embodiment, only the number of memories differs, and eight memories are used. However, some of the processes differ from those in the aforementioned embodiments; namely, the method for distributing data to the memories and the conditions for simultaneous readout are different. Hereinafter, the differences will be described.

(Distribution to Memories)

First, a method for distributing the three-dimensional accumulated information into the memories will be described. The values of the coordinates (x,y,t) of the three-dimensional accumulated information are expressed as C(x,y,t). The number of distributions in the x direction is expressed as P, the number of distributions in the y direction is expressed as Q, and the number of distributions in the t direction is expressed as R. P, Q, and R are integers of 1 or more aside from when P=1, Q=1, and R=1 (that is, (P,Q,R)#(1,1,1)), and the total number of memories into which the data is distributed is P×Q×R; memories are expressed as Mpqr (storage devices Mpqr). p, q, and r express memory numbers, where p is a memory number value in the x direction, q is a memory number value in the y direction, and r is a memory number value in the t direction.

Here, the storage destination of C(x,y,t) is expressed using Formula (22).

$$Mpqr[address]=C(x,y,t) \tag{22}$$

Meanwhile, the memory numbers p, q, and r into which the pixel values of the coordinates (x,y,t) are stored are expressed using the following Formulas (23) through (25).

$$p=x\%P \tag{23}$$

$$q=y\%Q \tag{24}$$

$$r=t\%R \tag{25}$$

Note that "%" expresses a remainder calculation.

The respective coordinates (x',y',t') of the memories Mpqr are expressed through Formulas (26) through (28).

$$x'=x/P \tag{26}$$

$$y'=y/Q \tag{27}$$

$$t'=t/R \tag{28}$$

Note that the number is rounded down to the nearest whole number in the division (/) carried out when calculating x', y', t'.

In addition, the width of the three-dimensional accumulated information stored in the memories Mpqr is taken as m_width and the height thereof is taken as m_height. Here, m_width and m_height can be calculated based on the following Formulas (29) and (30) from the width and height of the pre-distribution three-dimensional accumulated information and the values of P, Q, and R.

$$m\_width=width/P \tag{29}$$

$$m\_height=height/Q \tag{30}$$

Note that the number is rounded up to the nearest whole number in the division (/) carried out when calculating m_width and m_height.

The addresses of the storage destination memories Mpqr are expressed through the following formula.

$$address=(m\_width*m\_height)*t'+m\_width*y'+x' \tag{31}$$

The preceding have been formulas for distributing the three-dimensional accumulated information to memories in accordance with a predetermined rule. In the present embodiment, P=2, Q=2, and R=2, and thus the three-dimensional accumulated information 1310 in each set of coordinates is distributed to and stored in memories (M000) through (M111).

(Accumulated Image Readout)

Next, conditions for simultaneous readout will be described. In the three-dimensional accumulated information, a cubic space 1312 corresponds to the local area described in the aforementioned embodiments (this is referred to as a "local space" in the three-dimensional accumulated information). Here, the coordinates of the two points that represent the opposing corners of the local space 1312 are expressed as $(x_0, y_0, t_0)$, $(x_1, y_1, t_1)$. A, B, C, D, E, F, G, and H are assumed to represent respective accumulated information value positions, as indicated in the following Formula (32).

$$A:(x_0-1,y_0-1,t_0-1),$$

$$B:(x_1,y_0-1,t_0-1),$$

$$C:(x_0-1,y_1,t_0-1)$$

$$D:(x_1,y_1,t_0-1),$$

$$E:(x_0-1,y_0-1,t_1),$$

$$F:(x_1,y_0-1,t_1),$$

$$G:(x_0-1,y_1,t_1),$$

$$H:(x_1,y_1,t_1) \tag{32}$$

Here, the sum value S3d of the elements within the local space 1312 of the three-dimensional input information can be computed through the following Formula (33).

$$S_{3d}=H-D-F+B-(G-C-E+A) \tag{33}$$

Here, the width (in the x direction) of the local space is defined as la_width, the height (in the y direction) is defined as la_height, and the time (in the t direction) is defined as la_time. In this case, the conditional expressions derived in accordance with the distribution rule of the present embodiment are expressed through the following Formulas (34) through (36).

$$la\_width! = P*l \quad (34)$$

$$la\_height! = Q*n \quad (35)$$

$$la\_time! = R*m \quad (36)$$

Note that l, m, n are integers greater than or equal to 1. Furthermore, "!" used in the conditional expressions (34) through (36) expresses a negation. In other words, la_width is a value aside from a multiple of P, la_height is a value aside from a multiple of Q, and la_time is a value aside from a multiple of R.

When all of the aforementioned conditional expressions (34) through (36) are met, the memories can be put into an exclusive relationship, which makes it possible to simultaneously read out the values of the eight vertices of the local space. Furthermore, if one or two of the conditional expressions (34) through (36) can be met, the values of some of the eight vertices of the local space can be read out simultaneously.

Thus, as described thus far, a rule for distribution to memories and conditions for simultaneous readout are defined, and by adding those conditions to the learning, the accumulated information in the positions of the vertices in the local space can always be read out simultaneously from multiple memories without increasing the overall memory size, even for three-dimensional information.

The preceding embodiments have described the first through third dimensions. It is clear that the same methods can be applied even to hyper-rectangles, with accumulated information for multidimensional input information that exceeds three dimensions.

Meanwhile, although the aforementioned embodiments describe examples in which weak discriminators are used in the pattern identification process, the present invention is not limited thereto. In actuality, various proposals have been made with respect to pattern identification processes, and the implementation thereof can be carried out in a variety of ways. It is clear that, when calculating feature amounts using accumulated information in a pattern identification process, the same methods can be applied.

Although the aforementioned embodiments describe methods in which data that is adjacent in the upward, downward, left, and right directions in the original accumulated information are distributed to different memories as methods for distributing the data according to a predetermined rule, the present invention is not limited thereto. For example, pieces of accumulated information that are near one another may be locally collected and distributed into different memories. FIG. 14 illustrates an example thereof. 1401 indicates a pre-distribution integrated image. The A, B, C, and D allocated to the integrated image 1401 indicate the types of the distribution destination memories. A are distributed to M00(1420), B are distributed to M10(1421), C are distributed to M01(1422), and D are distributed to M11(1423). In order to find the sum of a local area 1402 from the integrated image 1401, the pixels indicated by 1410, 1411, 1412, and 1413 are read out. It can be seen that the readout destination memories at this time are all divided amongst M00 through M11. It is therefore clear that the same effects can be achieved even when pieces of accumulated information that are near one another are distributed to the memories.

As described thus far, according to the aforementioned configuration, an integrated image is saved in multiple memories according to a predetermined rule, and parameters for a local area are learned in advance in accordance with the rule so that the readout destination memories having multiple values necessary for the calculation of a sum value are in an exclusive relationship. Through this, multiple readouts necessary for the calculation of the sum value can be carried out simultaneously. In other words, it is possible to read out the accumulated information at the positions of each vertex of the local area simultaneously from multiple memories, without increasing the number of memory ports, the overall memory size, and so on.

According to the present invention, it is possible to provide a technique that enables the high-speed reading and writing of an accumulated image without increasing the size of a memory.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-188755, filed Aug. 25, 2010, which is hereby incorporated by reference herein in its entirety.

What is claimed is:

1. A pattern identification apparatus comprising:
   a computation unit configured to, for each of multiple data elements in input information that are stored in an array, compute an accumulated information value corresponding to the position of the data element in the array;
   a writing unit configured to write each of the computed accumulated information values into one of multiple storage units provided in advance, based on the positions of the corresponding data elements in the array;
   a readout unit configured to read out, in parallel and one each from the multiple storage units, the accumulated information values decided based on the positions in the array that corresponds to a local area, the local area being an area within an area of interest in the input information;
   a calculation unit configured to calculate a feature amount of the local area using the accumulated information values read out from the multiple storage units;
   a dictionary storage unit configured to store dictionary data including a parameter corresponding to a predetermined pattern; and a determination unit configured to determine whether or not the predetermined pattern is present in the area of interest by comparing the calculated feature amount with the parameter corresponding to the predetermined pattern, wherein at least one processor functions at least as one of the units.

2. The pattern identification apparatus according to claim 1, wherein the writing unit writes the accumulated information values corresponding to data elements present in positions that are adjacent to each other in the array into respectively different storage units.

3. The pattern identification apparatus according to claim 1, further comprising an updating unit configured to update the dictionary data using input information that has been proved in advance to contain the predetermined pattern and input information that has been proved in advance to not contain the predetermined pattern.

4. The pattern identification apparatus according to claim 1,
wherein a rule for deciding the storage unit into which the writing unit is to write the accumulated information value is determined in advance;
the pattern identification apparatus further comprises a conversion unit configured to convert parameter information indicating the shape of the local area based on the rule; and
the readout unit decides on a storage unit and a memory address from which to read out the accumulated information value based on the converted parameter information.

5. The pattern identification apparatus according to claim 1,
wherein the array is a two-dimensional array;
the multiple storage units are P×Q (where P and Q are integers greater than or equal to 1, so that (P,Q)≠(1,1)) storage units Mpq (where p is an integer from 0 to P−1 and q is an integer from 0 to Q−1); and
the writing unit writes the accumulated information value corresponding to the data element at coordinates (x,y) in the two-dimensional array into the storage units Mpq based on p=x % P and q=y % Q (where % indicates a remainder calculation).

6. The pattern identification apparatus according to claim 1,
wherein the array is a two-dimensional array;
the multiple storage units are four storage units; and
the writing unit writes into one of the four storage units in accordance with even and odd combinations of coordinate values in the two-dimensional array.

7. The pattern identification apparatus according to claim 6,
wherein the local area is a rectangle, the lengths of whose sides are odd numbers, based on the coordinate values; and
the readout unit reads out, in parallel from the four storage units, the accumulated information values corresponding to the coordinate values of the vertices of the rectangle.

8. The pattern identification apparatus according to claim 1,
wherein the array is a one-dimensional array;
the multiple storage units are P (where P is an integer greater than or equal to 2) storage units Mp (where p is an integer from 0 to P−1); and
the writing unit writes the accumulated information value corresponding to the data element at coordinate (x) in the one-dimensional array into the storage units Mp based on p=x % P (where % indicates a remainder calculation).

9. The pattern identification apparatus according to claim 1,
wherein the array is a three-dimensional array;
the multiple storage units are P×Q×R (where P, Q, and R are integers greater than or equal to 1, so that (P,Q,R)≠(1,1,1)) storage units Mpqr (where p is an integer from 0 to P−1, q is an integer from 0 to Q−1, and r is an integer from 0 to R−1); and
the writing unit writes the accumulated information values corresponding to the data elements at coordinates (x,y,t) in the three-dimensional array into the storage units Mpqr based on p=x % P, q=y % Q, and r=t % R (where % indicates a remainder calculation).

10. A non-transitory computer-readable storage medium on which is stored a program for causing a computer to function as the units of the pattern identification apparatus according to claim 1.

11. A control method for a pattern identification apparatus, the method comprising:
computing, for each of multiple data elements in input information that are stored in an array, an accumulated information value corresponding to the position of the data element in the array;
writing each of the computed accumulated information values into one of multiple storage units provided in advance, based on the positions of the corresponding data elements in the array;
reading out, in parallel and one each from the multiple storage units, the accumulated information values decided based on the positions in the array that corresponds to a local area, the local area being an area within an area of interest in the input information;
calculating a feature amount of the local area using the accumulated information values read out from the multiple storage units; and
determining whether or not a predetermined pattern is present in the area of interest by comparing the calculated feature amount with a parameter corresponding to a predetermined pattern included in dictionary data stored in a dictionary storage unit.

* * * * *